Figure 1:
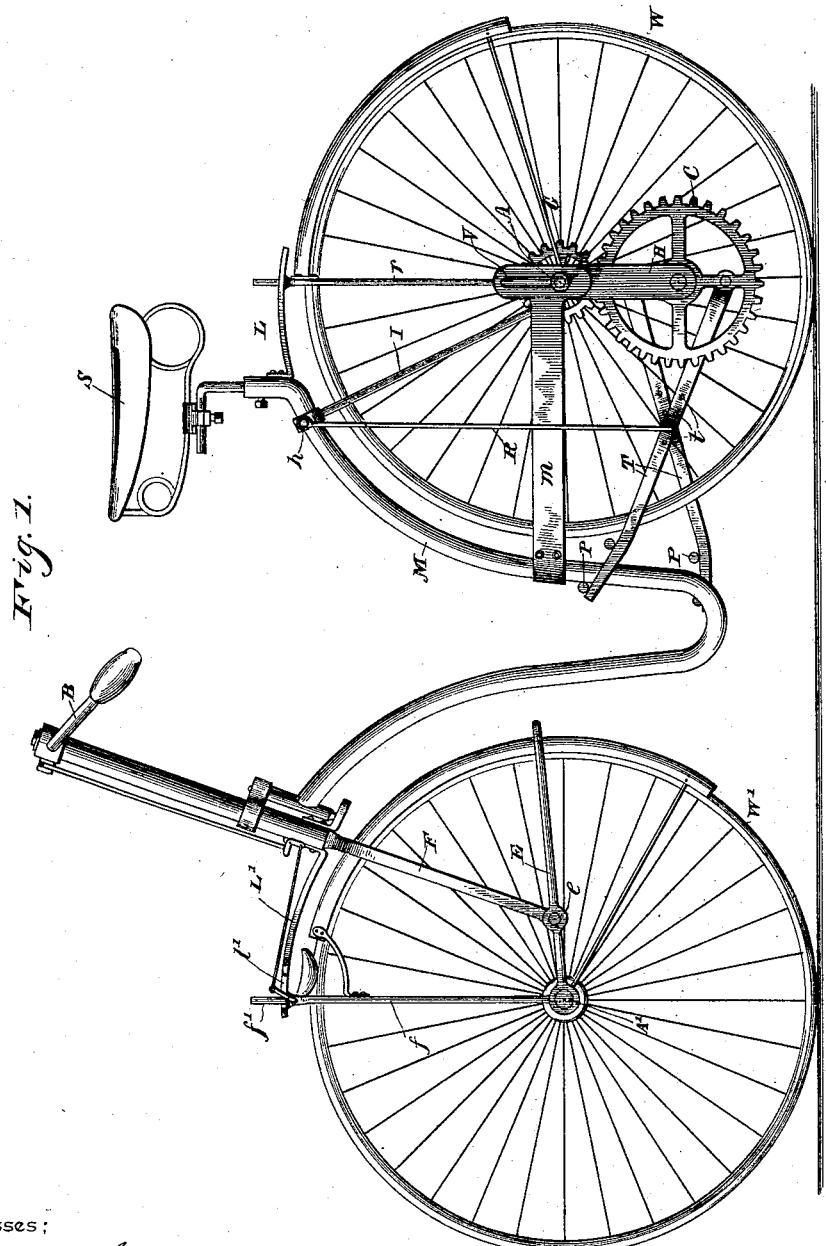

(No Model.) 2 Sheets—Sheet 1.

S. E. MOSHER.
BICYCLE.

No. 477,772. Patented June 28, 1892.

Witnesses:

Inventor
Samuel E. Mosher,
By his Attorneys, (No Model.) 2 Sheets—Sheet 2.
S. E. MOSHER.
BICYCLE.
No. 477,772. Patented June 28, 1892.
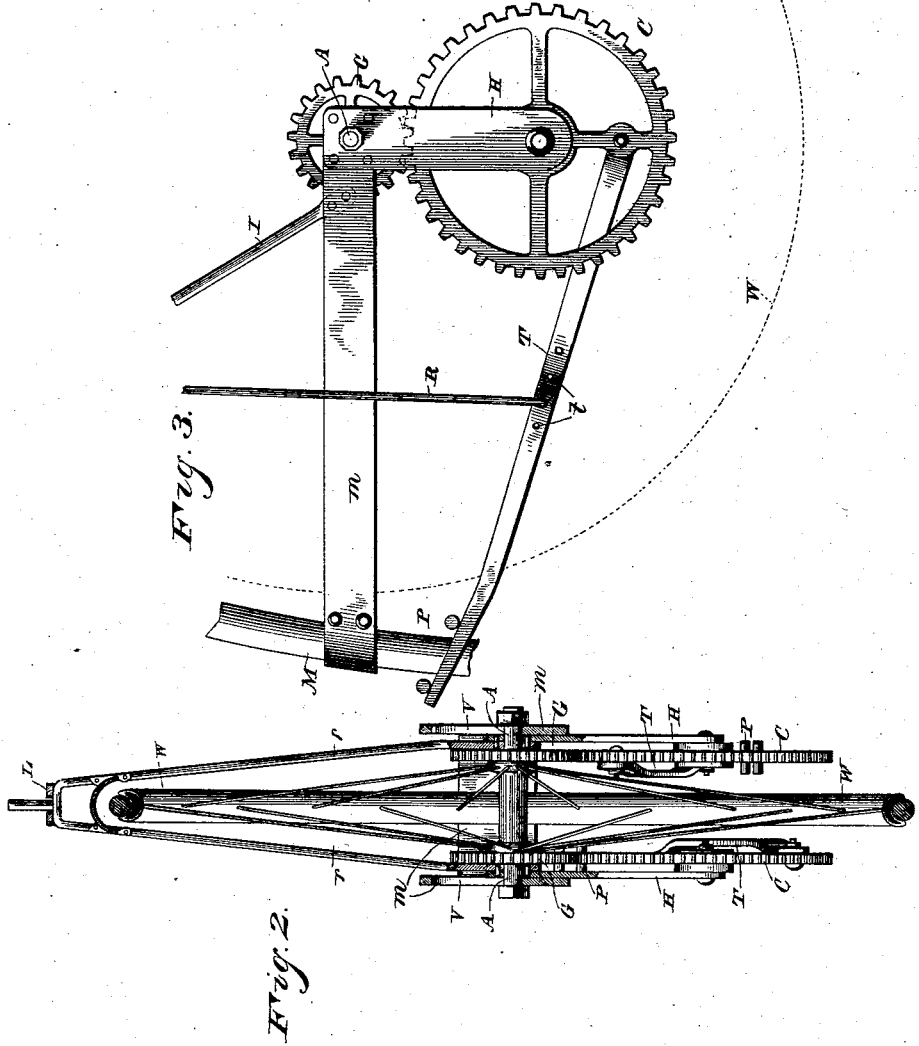
Witnesses:
J. M. Withrow.
N. J. Collamer.
Inventor
Samuel E. Mosher
By his Attorneys,
C. A. Snow & Co.

United States Patent Office.

SAMUEL EARL MOSHER, OF CHILLICOTHE, OHIO.

BICYCLE.

SPECIFICATION forming part of Letters Patent No. 477,772, dated June 28, 1892.

Application filed June 27, 1891. Serial No. 397,693. (No model.)

*To all whom it may concern:*

Be it known that I, SAMUEL EARL MOSHER, a citizen of the United States, residing at Chillicothe, in the county of Ross and State of Ohio, have invented a new and useful Bicycle, of which the following is a specification.

This invention relates to that class of velocipedes known as "rear-driving Safety bicycles;" and the object of the same is to effect certain improvements in machines of this character.

To this end the invention consists in a bicycle constructed substantially as hereinafter more fully described and claimed, and as illustrated on the two sheets of drawings, wherein—

Figure 1 is a side elevation of this improved machine. Fig. 2 is an enlarged sectional view through the driving-wheel, showing the driving-gear, the hanger for the crank-gear, the rear axle, and a portion of the frame. Fig. 3 is a side elevation of a slightly-different construction of driving mechanism and frame.

Referring to the said drawings, the letter M designates the main frame of this machine, which supports the seat S.

F is the front or steering fork, having the handle-bar B, and W W' are respectively the rear or driving and the front or steering wheels.

The letter G designates the driving-gear, mounted on the main axle A and fast to the hub of the rear wheel W; C, a crank-gear mounted in a hanger H; T, a treadle connected to the crank of such gear and having a foot-piece P at its front end, and R a swinging rod for supporting this treadle, it being understood that all this driving mechanism is in duplicate on the two sides of the rear wheel W.
The main frame M is preferably of approximately U shape, as shown, in order that the machine may be ridden by a lady and that under such circumstances her dress will fall into the U of the frame, and the seat or saddle S is supported upon the rear end of this frame, while the steering-fork F is pivotally connected to the front end thereof. From the fork projects forwardly a leaf-spring L', having a longitudinal slot l' near its free front end, and f is another fork mounted on the axle A' of the front wheel and having a pin f' at its upper end engaging said slot l'. Also pivotally mounted on said axle is an elongated loop E, extending rearwardly around the front wheel W' and having pivotally connected thereto at e the lower end of the fork F. By this construction when the front wheel strikes an obstruction the leaf-spring L' yields and allows the supplemental fork f to rise slightly, the loop E swinging down around the rear side of the wheel as the main fork F, and with it the front end of the main frame M, descends; but the strength of the spring L' will hold the parts normally in their proper position.

With respect to the rear or driving wheel W, r is the rear supplemental fork, whose upper end similarly engages a leaf-spring L, projecting rearwardly from the rear end of the main frame M. m is a strap-frame standing approximately horizontal and leading from the main frame M rearwardly to the rear axle A, and this strap-frame has preferably a vertical slot V at its rear end, which embraces and moves loosely over said axle, and I is an inclined brace connecting the rear end of this strap-frame with the upper rear end of the main frame. With this construction the rear wheel is allowed to yield vertically slightly, its axle moving in said vertical slots, and the rear supplemental fork r rising therewith and bending the leaf-spring L, while the strength of said spring will hold the parts normally in their proper position.

The hanger H depends from the rear supplemental fork r, and pivoted in the lower end of said hanger is a cranked gear-wheel C, which intermeshes with the driving gear-wheel G, which is fast on the axle A. The treadle T is pivotally connected in any suitable manner with the crank-pin of said crank-gear, and this crank-pin preferably extends inwardly from the side of the wheel, so as not to catch on the clothing of the rider, while the hanger of course is on the outer side only of the wheel in order to allow the proper movement of the rear end of the treadle. As said rear end inscribes its circle the center of the treadle is caused to move in an approximate horizontal line by being supported by a rod R, which rod is pivotally connected or linked at its lower end into one of a number of holes $t$ in the treadle, while its upper end is pivotally mounted on a horizontal stub-shaft $h$, carried by the main frame. The foot-piece P at the front end of the treadle is of any preferred construction, forming no part of the present invention.

In Fig. 3 the strap-frame $m$ is shown unprovided with the slot V, in which case the rear wheel W will have no yielding motion, as above described, and the hanger H may depend from the strap-frame. In this case the supplemental rear frame $r$ and the leaf-spring L are omitted, as shown. This is a construction I sometimes employ where it is not desirable that the machine shall possess in its rear wheel the yielding properties which the construction first described would give it.

I make no specific reference to the various other elements and features which go to make up a bicycle of this character. It is obvious that the mud-guards, the brake, the saddle, and various other features shown in the drawings might be constructed and applied as there illustrated or in any other preferred manner, and it will also be understood that considerable change in the specific details of construction herein set forth may be made without departing from the essential features of my invention.

A bicycle constructed in accordance with this specification will be simple, light, strong, and durable and will possess all the necessary and desirable attributes. The peculiar motion of the treadles in propelling the machine is very natural and easy, and obviously the gear-wheel G could be replaced by another, whereby the machine could be "geared up" to a greater or less degree and even greater on one side than on the other in case of deformity of or weakness in one of the rider's limbs.

What is claimed as new is—

1. In a bicycle, the combination, with the main frame having a rearwardly-extending strap-frame provided with vertical slots and the rear wheel, whose axle is mounted in said slots, of a leaf-spring extending rearwardly from said main frame and a supplemental fork whose ends are connected with the axle and whose body engages said spring, substantially as described.

2. In a bicycle, the combination, with the rear wheel having a driving-gear on its shaft, a hanger from the axle of said wheel, and a crank-gear journaled in said hanger, engaging said driving-gear and having an inwardly-extending crank-pin, of a treadle connected to said crank and a swinging support for said treadle, substantially as described.

3. In a bicycle, the combination, with the main frame having a rearwardly-extending strap-frame provided with vertical slots, the rear wheel whose axle is mounted in said slots, a supplemental fork rising from the axle, a spring on the frame engaging the upper end of said fork, and a hanger depending from the axle, of a crank-gear journaled in said hanger, a driving-gear on the shaft with which said crank-gear intermeshes, a treadle connected to said crank, and a swinging support for said treadle, substantially as hereinbefore set forth.

In testimony that I claim the foregoing as my own I have hereto affixed my signature in presence of two witnesses.

SAMUEL EARL MOSHER.

Witnesses:
GEO. B. BITZER,
CHARLES FREY.